US005548480A

United States Patent [19]

Rudi et al.

[11] Patent Number: 5,548,480
[45] Date of Patent: Aug. 20, 1996

[54] TAPE DRIVE WITH FLOATING SUPPORT FOR INSERT

[75] Inventors: Guttorm Rudi, Fjellhamar; Ornulf Jansen, Oslo; Halvor O. Kuifte, Haslum; Petter Busengdal, Oslo, all of Norway

[73] Assignee: Tandberg Data Storage AS, Oslo, Norway

[21] Appl. No.: 339,835

[22] Filed: Nov. 15, 1994

[51] Int. Cl.[6] .................................. G06F 1/16; H05K 7/14
[52] U.S. Cl. ..................... 361/685; 364/708.1; 248/581
[58] Field of Search .................................. 361/683, 685, 361/686, 687, 724, 725, 726, 727, 800; 364/708.1; 360/97.01, 137; 248/581, 576, 586, 589, 609, 634, 635, 636, 638; G06F 1/16

[56] References Cited

U.S. PATENT DOCUMENTS

| | | |
|---|---|---|
| 4,479,198 | 10/1984 | Romano et al. ................. 364/708.1 |
| 5,128,830 | 7/1992 | Deluca et al. ................... 361/687 |
| 5,216,582 | 6/1993 | Russell et al. .................. 361/685 |
| 5,402,308 | 3/1995 | Koyanagi et al. ............... 361/685 |
| 5,463,527 | 10/1995 | Hager et al. .................... 361/685 |

Primary Examiner—Leo P. Picard
Assistant Examiner—Lynn D. Hendrickson
Attorney, Agent, or Firm—Hill, Steadman & Simpson

[57] ABSTRACT

A rectangular cylindrical suspension for a data storage drive unit such as a tape drive, the suspension secured into a computer housing, providing resilient leaf springs on a bottom wall and protrusions on a top wall for clasping the data storage drive unit within the cylinder spaced from the top, bottom and side walls of the suspension to create a resilient holding of the data storage drive. The cylindrical suspension can be fashioned of ferromagnetic materials to provide a magnetic shielding as well as a suspension. The suspension prevents dimensional distortion within the data storage drive unit caused by fixedly attaching the suspension to the computer housing where dimensional tolerances may not be accurate.

26 Claims, 5 Drawing Sheets

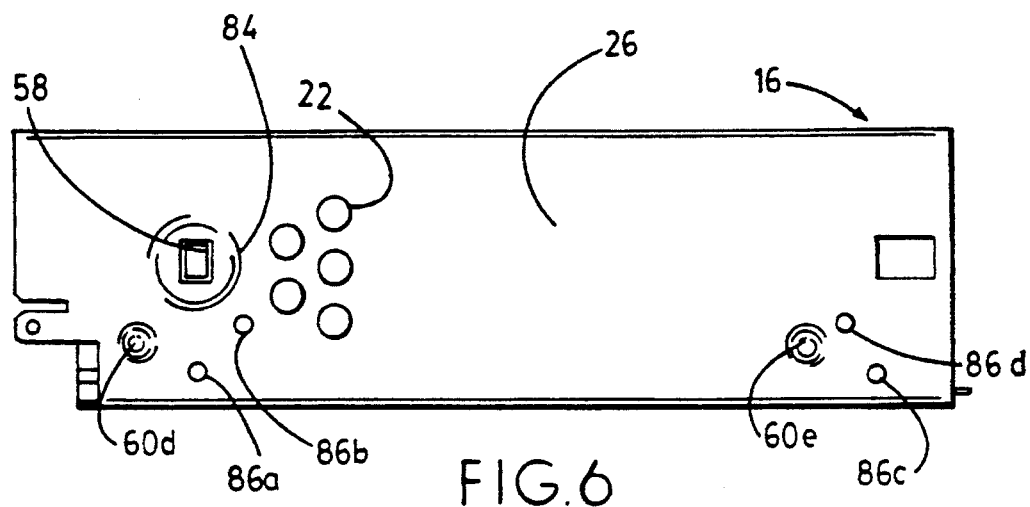
FIG. 6
FIG. 7
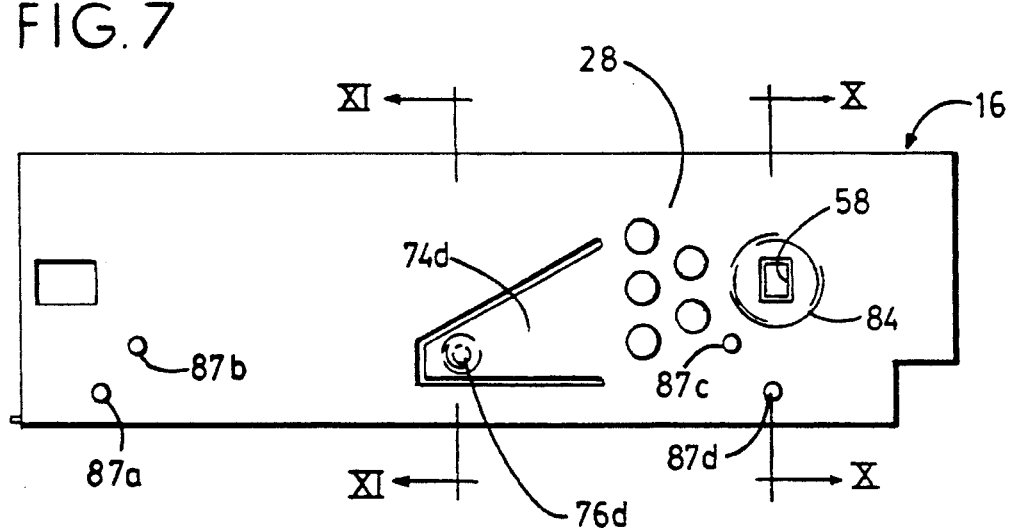
FIG. 8
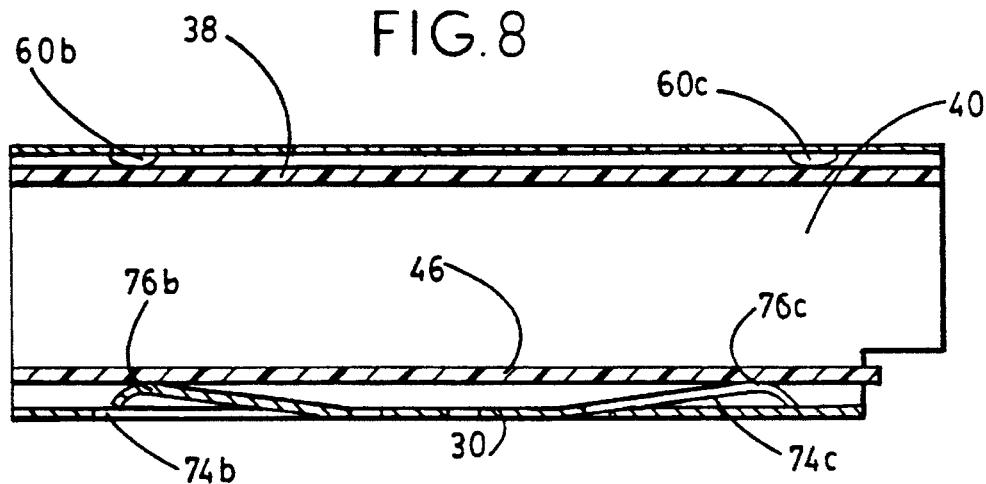

5,548,480

TAPE DRIVE WITH FLOATING SUPPORT FOR INSERT

BACKGROUND OF THE INVENTION

The present invention relates to data storage and data retrieval for computers, particularly to a suspension member for holding the chassis of a data storage drive such as a tape drive.

Computers, particularly personal computers, can use a plurality of data storage devices or drives depending on application. Typically, a magnetic tape drive, a magnetic floppy disk drive, and/or magnetic hard disk drive, are used in personal computers for storing data and programs and retrieval therefrom. Additionally, an optical disk drive can be used such as a CD-ROM.

In all kinds of magnetic or optical storage, it is important that the magnetic or optical head is properly aligned relative to the preset spacial datums for the storage media, e.g., the spacial position of the data cartridge within the drive. After adjustment of the magnetic or optical head relative to the storage datum, this adjustment must remain stable even after the physical mounting of the data storage drive into a computer housing. Typically, the mounting surfaces in computer housings are imprecisely positioned, having wide dimensional tolerances. When tightening the mounting screws for holding the chassis of a data storage drive, there can be a distortion of the data storage drive chassis by forced conformance to the mounting surfaces and thereby a change of the alignment of the magnetic or optical head relative to the preset spacial datums for storage media within the drive.

SUMMARY OF THE INVENTION

It is an object of the present invention to provide a suspension arrangement for the chassis of a data storage drive which accommodates distortion caused by securement to a computer housing. It is an object of the present invention to provide a suspension which also provides a electromagnetic shielding surrounding the data storage drive. It is an object of the present invention to provide a floating suspension for a data storage drive which can be secured within a computer housing either before or after the data storage drive is secured to the suspension. It is an object of the present invention to provide a suspension for a data storage drive which resiliently mounts a data storage drive allowing for distortion or mistolerance of the suspension due to manufacturing tolerances of the suspension, or of the computer housing to which it is attached.

The objects of the invention are achieved in that a rectangular tubular suspension is provided having resilient members for holding a data storage drive within the tubular suspension in a non-fixed or "floating" manner. The objects are achieved in that the tubular suspension is constructed of a material which provides an electromagnetic shielding of the data storage drive. The objects are achieved in that the tubular suspension provides mounting holes for securement to rails or walls within the computer housing. The suspension receives the data storage drive through one of its open ends and the data storage drive is secured in place, for example, by spring tabs received in apertures in the tubular suspension.

The objects are achieved in that a three-point suspension holds the data storage drive and defines an appropriate datum plane such as a horizontal plane, and relieves distortion forces on the chassis caused by its fixation into a computer housing. The suspension provides three leaf springs on a bottom wall in corresponding planar relationship with three protrusions on an opposite top wall thereof. The objects of the invention are achieved in that a leaf spring is arranged on one side wall and protrusions are arranged on the respective opposite side wall wherein the data storage drive chassis is clamped between the opposing leaf spring and protrusions, thus forming a three point loading to orient the drive in the datum plane.

The invention is particularly advantageous for a tape drive wherein the magnetic head of the tape drive is oriented by top and bottom walls of the data storage drive chassis. Any distortion of the chassis caused by forced mounting to a computer housing having dimensional mistolerances would tend to disorient the otherwise preset position of the head with respect to a tape cartridge carried within the data storage drive. Therefore, the tubular suspension receives the tape drive chassis through a back open end thereof, the tubular suspension having screw holes for lateral mounting of the suspension within the computer housing. The bottom leaf springs opposing top protrusions, and a side leaf spring facing opposite side dual protrusions, positions the tape drive in a proper plane, and into proper position within that plane, in a resilient or "floating" fashion. Therefore, the tubular suspension can be secured in place by screws or otherwise in a fixed fashion and any distortion will be compensated for by the resilient nature of the leaf springs and protrusions. The relative position of the head vis-a-vis the chassis remains substantially constant.

BRIEF DESCRIPTION OF THE DRAWINGS

FIG. 6 is a right side view of the suspension shown in FIG. 2;

FIG. 7 is a left side view of the suspension shown in FIG. 2;

FIG. 8 is a sectional view taken generally along line VIII—VIII of FIG. 4;

DETAILED DESCRIPTION OF THE PREFERRED EMBODIMENTS

Figure 1:
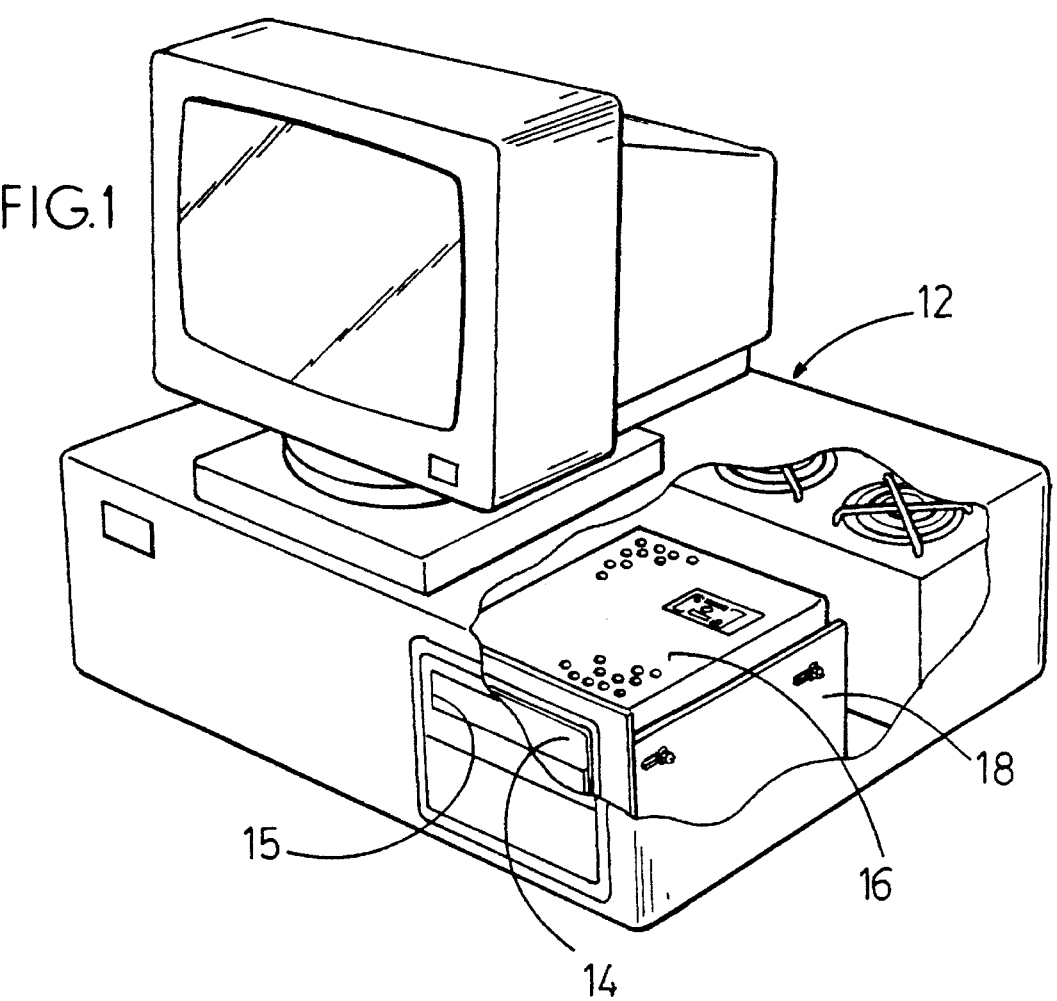
FIG. 1 is a perspective view of a computer housing with a cover portion removed for clarity, including a suspension of the present invention holding a data storage drive.

FIG. 1 is a partial perspective view of a computer housing 12 showing a data storage drive, such as a tape drive 14 held within a tubular suspension 16, the tubular suspension mounted to parallel side walls 18 (only one shown) of the computer housing. A data cartridge (not shown) is insertable into the tape drive 14 through a door 15 of the housing 12.

Figure 2:
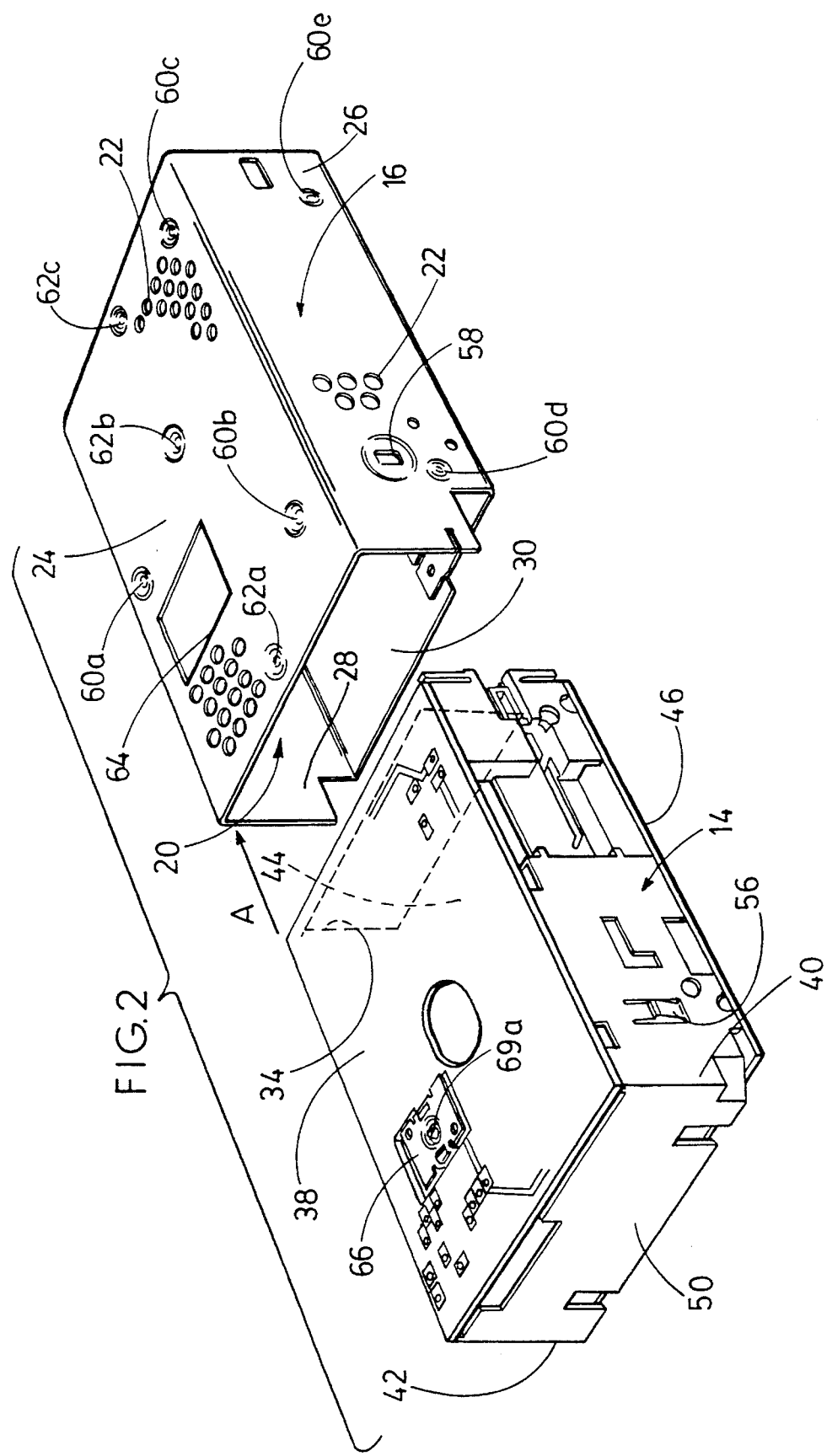
FIG. 2 is an exploded rear perspective view of the tape drive and suspension member shown in FIG. 1.

FIG. 2 shows the tape drive 14 separated from the suspension 16. The tape drive 14 is inserted through a back open end 20 of the suspension 16 in a direction A. The suspension 16 is a rectangular tubular member having perforations 22 through a top wall 24 substantially over its entire surface (only a small number are shown). These perforations 22 are for heat dissipation purposes. Perforations 22 are also provided through right side wall 26 and left side wall 28 as well as throughout a bottom wall 30. The suspension 16 can be optimally fashioned of a electromagnetic shielding material.

The tape drive has a front opening 34 for receiving a tape cartridge therein, the opening in registry with the door 15 of the housing 12. The front opening 34 is defined by a top mounted printed circuit board 38, right side wall 40, left side wall 42 and a cartridge supporting surface 44. A bottom mounted printed circuit board 46 delimits a bottom extent of the tape drive. The right side wall 40 and the left side wall 42 are connected by a back wall 50. Between the left side wall 42 and the right side wall 40, the back wall 50 and the front opening 34 and between the top circuit board 38 and the bottom circuit board 46 is a lattice type framework molded integrally with the side walls 40, 42, back wall 50, and cassette supporting surface 44, forming a chassis. The chassis can be an injection molded plastic. The lattice type framework includes structure for supporting the magnetic head in fixed orientation as described in FIG. 3.

The right side wall 40 and the left side wall 42 each comprise a resilient locking tab 56 which engages into a rectangular aperture 58 of the suspension 16 when the tape drive 14 is fully inserted within the suspension 16. The suspension 16 is preferably constructed of a ferromagnetic material to act as a magnetic shield to prevent interference with the magnetic head. The top wall 24 provides inwardly stamped major protrusions or indents 60a, 60b and 60c; and minor protrusions or indents 62a, 62b and 62c. The right side wall provides two major protrusions 60d, 60e spaced apart at opposite ends of the wall. The major protrusions 60a, 60b, 60c are arranged in a triangle pattern on the top wall. The major protrusions extend more deeply inwardly than the minor protrusions. The top wall 24 provides a rectangular aperture 64 for receiving a head support 66 on the tape drive 14.

The printed circuit boards 38, 46 provide necessary electronic circuitry for control and signal processing of the tape drive 14 such that the tape drive can be a modular and complete unit for sale and installation into a computer housing.

Figure 3:
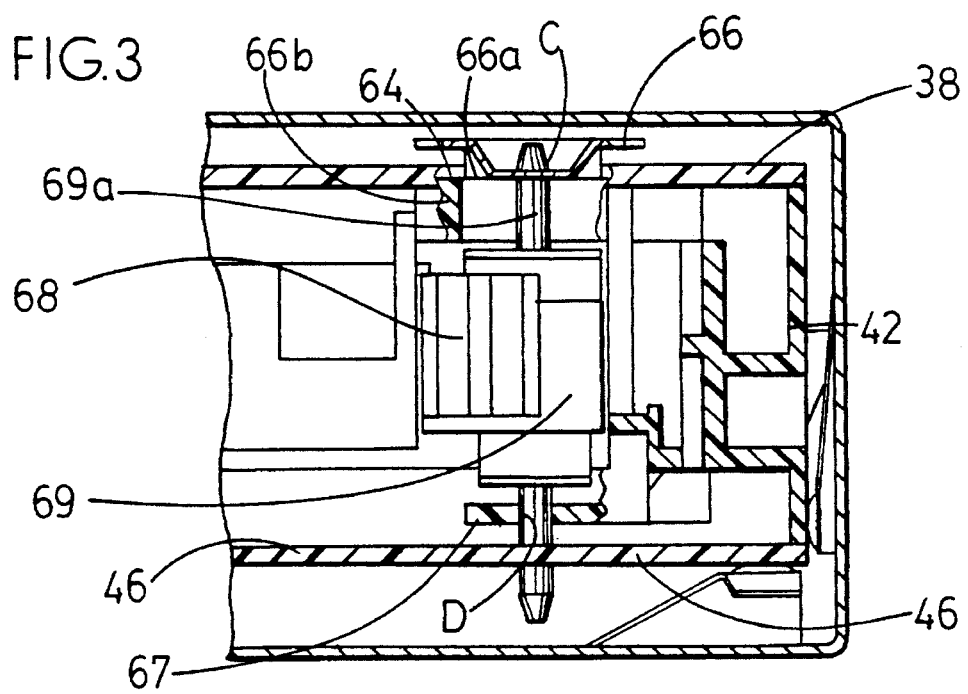
FIG. 3 is a partial sectional view taken generally along line III—III of FIG. 4.

FIG. 3 illustrates the typical suspension of a head within the tape drive 14 including the head support 66, and a bottom support 67 holding a magnetic head 68 on a pivotably tray 69. The head support 66 is fixed at region 66a to lattice structure 66b of the tape drive 14. The head tray 69 is journal on an axle 69a fixed at points C and D to the head support 66 and bottom support 67 respectively. The head support 66 protrudes upwardly through the aperture 64 of the printed circuit board 38. Thus, any distortion of the tape drive 14, particularly the chassis causes a change in the positions of points C and D and will change the orientation of the axle 69a and thus the head 68. Even small misorientations can adversely effect performance of the head 68.

Figure 4:
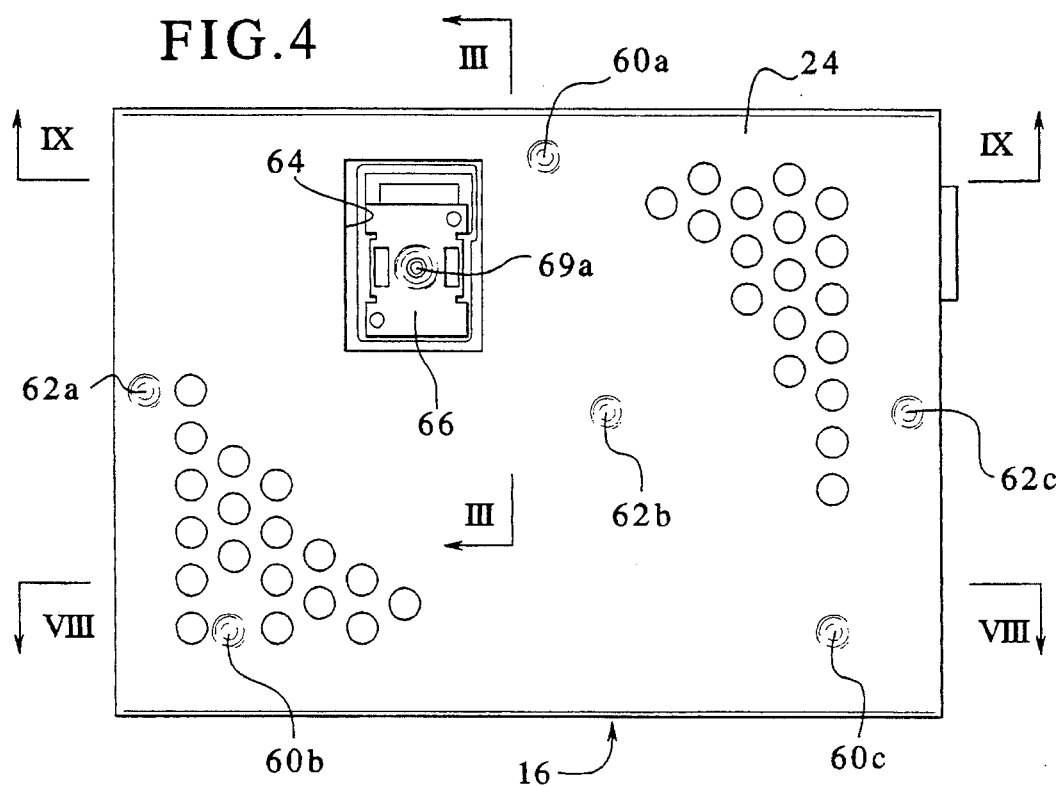
FIG. 4 is a top plan view of the assembly shown in FIG. 2 in an assembled state.

FIG. 4 illustrates the assembly of FIG. 2 in an assembled condition wherein the head support 66 is registered within the aperture 64. The major protrusions 60a,b,c are arranged in a triangle pattern and the minor protrusions 62a,b,c are generally arranged along an axial center line.

Figure 5:
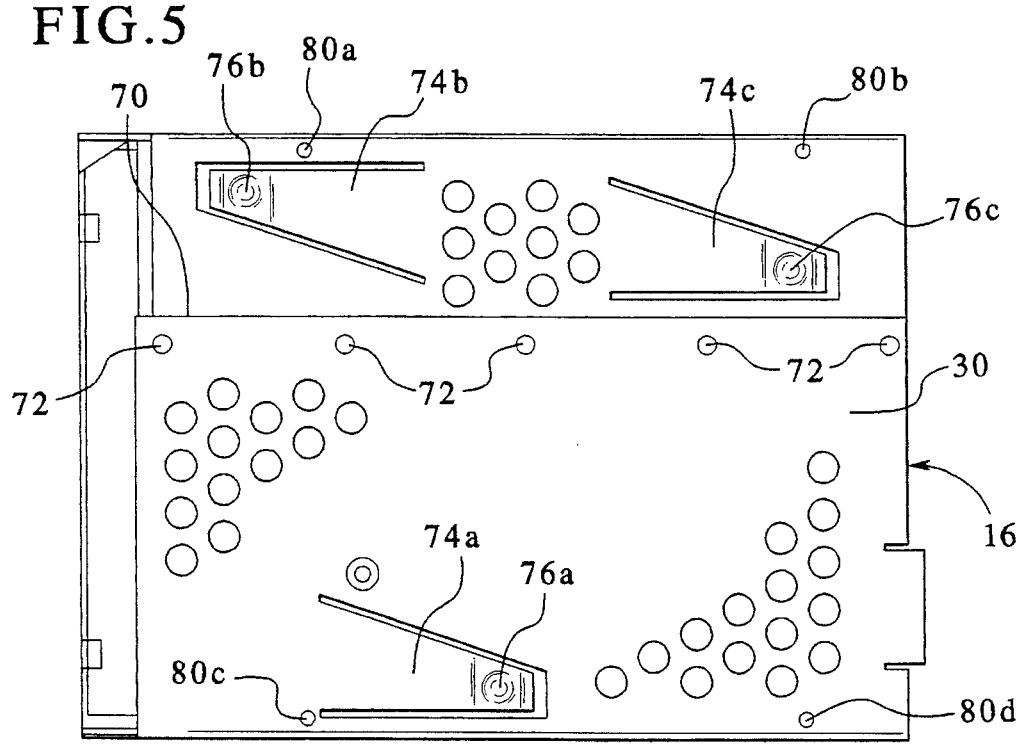
FIG. 5 is a bottom view of the assembly shown in FIG. 4.

FIG. 5 illustrates the bottom wall 30 of the suspension 16 including a joint 70 having spot welds or rivets 72. The suspension 16 can thus be fold formed of stamped sheet metal and seamed to form the rectangular cylinder. Stamped formed on the bottom wall 30 are three leaf springs 74a, 74b, 74c directed inwardly with inwardly formed raised semispheres or buttons 76a, 76b, 76c. The buttons 76a, 76b, 76c substantially underlie the protrusions 60a, 60b, 60c such that the tape drive 14 can be resiliently clasped therebetween, in a three point loading-planar orientation. Also arranged on the bottom wall 30 are threaded apertures 80a, 80b, 80c, 80d for screw mounting of the suspension 16 to the computer housing as applicable.

FIG. 6 illustrates the right side of the suspension 16 including the rectangular aperture 58 which is stamped formed along with a circular raised boss 84 which assists in stiffening and properly orienting the rectangular aperture 58. The aperture 58 is sufficiently larger than the tabs 56 to allow for mistolerances without binding.

FIG. 7 illustrates the left side view which includes a leaf spring 74d including an inwardly directed button 76d at approximately a center position of the left side 28. The leaf spring 74d is cut and bent inwardly from the left side wall 28. Thus, when the tape drive 14 is inserted into the suspension 16, the tape drive is resiliently held between the protrusions 60d, 60e and the button portion 76d of the leaf spring 74d, in a three point horizontal positioning. The right side wall provides threaded apertures 86a, 86b, 86c, 86d; and the left side wall provides apertures 87a, 87b, 87c, 87d, for mounting the suspension 16 to the walls 18 within the computer housing as applicable.

FIG. 8 illustrates the loading between the protrusions 60b, 60c and the buttons 76b, 76c against the printed circuit boards 38, 46 connected on opposite sides of the side wall 40 and the lattice framework of the tape drive (not shown). The leaf springs 74a, 74b, 74c are cut and bent inwardly from the bottom wall 30.

Figure 9:
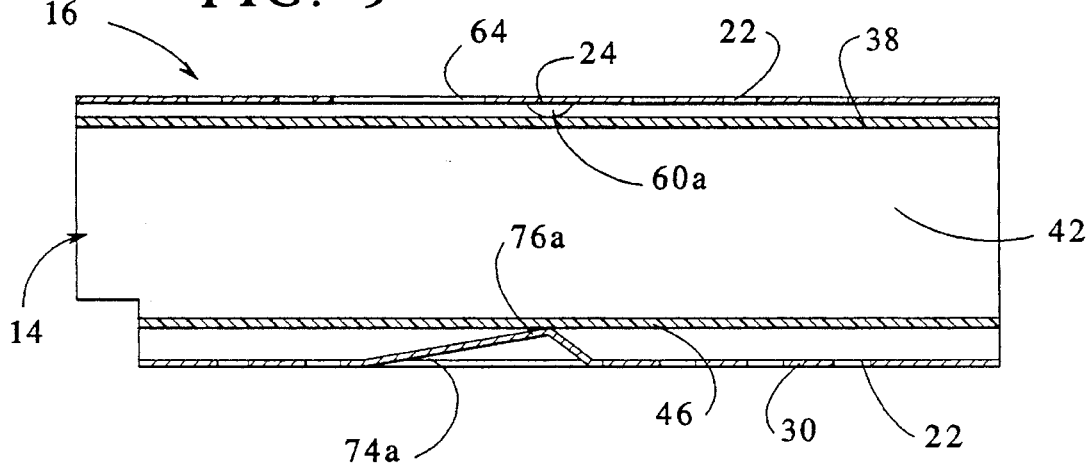
FIG. 9 is a sectional view taken generally along line IX—IX of FIG. 4.
Figure 10:
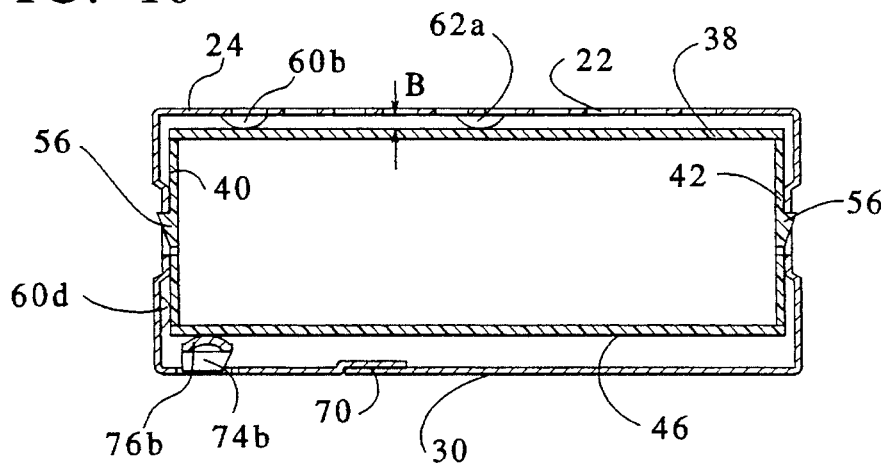
FIG. 10 is a sectional view taken generally along line X—X of FIG. 7.
Figure 11:
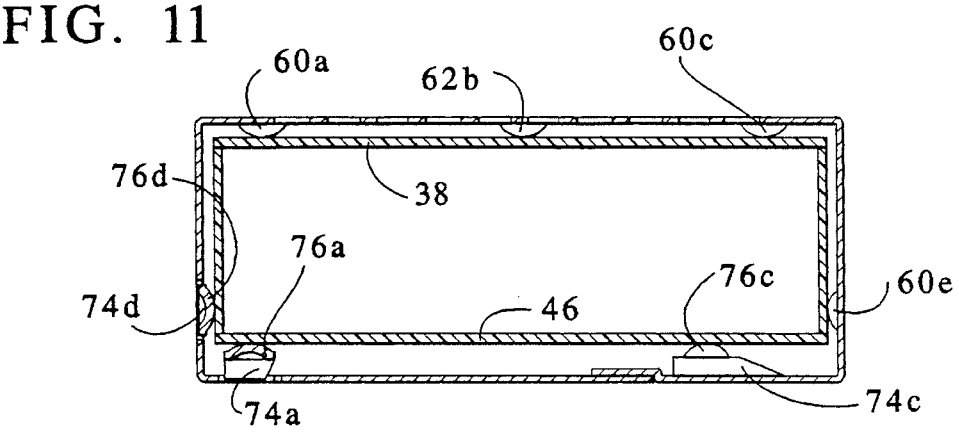
FIG. 11 is a sectional view taken generally along line XI—XI of FIG. 7.

FIGS. 9–11 illustrate in sectional views the engagement between the tape drive 14 and the suspension 16. As illustrated, the tape drive 14 is held elevated from the bottom 30 of the suspension 16. Also, the tape drive 14 is held at a distance below the top wall 30 of the suspension 16. Thus, the tape drive 14 "floats" within the suspension 16 held by the three point loading of the leaf springs 74a, 74b, 74c and the protrusions 60a, 60b, 60c; and oriented in the horizontal plane by the three point loading between the leaf spring 74d and the protrusions 60d, 60e.

The shallow protrusions 62a, 62b, 62c shown in FIGS. 10–11 arranged on a bottom side of the top wall 30 toward the printed circuit board 38 serve a different function than suspension of the tape drive 14. It is possible that in constructing the suspension 16, or the printed circuit board 38, the top wall 30 and the board 38 could be bowed toward each other in a central region laterally between the protrusions 60a, 60c. An uncontrolled contacting between the printed circuit board, particularly contacts thereon, and the suspension could have adverse consequences. For that reason, three shallow protrusions 62a, 62b, 62c act as spacers to prevent any electrical contact where not intended, between the circuit board 38 and the top wall 30. These shallow protrusions 62a, 62b, 62c are designed and arranged so as not to contact the circuit board 38 at any undesirable electrical location and act as spacers to maintain the distance B between the top wall 30 and the printed circuit board 38.

It can be understood that because the tape drive 14 is held within the suspension 16 by resilient leaf springs rather than a fixed connection such as a screwed connection, any distortion applied to the suspension 16 will be compensated for by the resilient nature of the leaf springs so as not to transmit this distortion to the tape drive itself. This is important where the tape drive head has been preset in orientation with regard to the tape cartridge datum of the tape drive and any distortion relative between the two parts is detrimental.

Although a tape drive is illustrated and described above as an exemplary embodiment of the invention, any type of data storage drive, where precise location of a magnetic or optical head to its associated data storage medium is desirably maintained, could advantageously utilize the suspension of the present invention and such devices are encompassed by the present invention.

Although the present invention has been described with reference to a specific embodiment, those of skill in the art will recognize that changes may be made thereto without departing from the scope and spirit of the invention as set forth in the appended claims.

I claim as my invention:

1. A suspension for mounting a data storage drive into a computer housing, comprising:
   a suspension frame having at least a first wall and a second wall defining a space therebetween, said space sized to receive a data storage drive;
   a first leaf spring mounted to said second wall and a first protrusion extending inwardly from said first wall, said first leaf spring pressing the data storage drive against said first protrusion when the data storage drive is received within said space.

2. The suspension according to claim 1 wherein said frame comprises opposite side walls connected respectively to said first wall and said second wall, said frame sized closely surrounding the data storage drive when installed into said space.

3. The suspension according to claim 2 further comprising a further resilient member mounted on one of said side walls and two spaced apart inwardly directed further protrusions mounted on an opposite one of said side walls.

4. The suspension according to claim 1 further comprising second and third resilient members and second and third protrusions, said first, second and third resilient members and said first, second and third protrusions acting in respective resilient protrusion member pairs to provide a three-point planar suspension of the data storage drive in said frame.

5. A suspension for mounting a data storage drive into a computer housing, comprising:
   a suspension frame having at least a first wall and a second wall defining a space therebetween, said space sized to receive a data storage drive;
   a first resilient member mounted to said second wall and a first protrusion extending inwardly from said first wall, said first resilient member pressing the data storage drive against said first protrusion when the data storage drive is received within said space;
   comprising second and third resilient members and second and third protrusions, said first, second and third resilient members and said first, second and third protrusions acting in respective resilient protrusion member pairs to provide a three-point planar suspension of the data storage drive in said frame; and
   wherein said resilient members comprise leaf springs formed into said second wall and said protrusions comprise indents formed into said first wall.

6. The suspension according to claim 1 wherein said side walls provide a lateral resilient member and a lateral protrusion to hold the data storage drive laterally in position.

7. The suspension according to claim 1 wherein said frame is a metallic rectangular container having heat dissipating holes.

8. A suspension and a data storage drive combination for mounting into a computer housing, comprising:
   a data storage drive;
   a suspension frame having at least a first wall and a second wall defining a space therebetween;
   a first leaf spring mounted to said second wall and a first protrusion extending inwardly from said first wall, said first leaf spring pressing said data storage drive against said first protrusion when said data storage drive is slidingly received within said space; and
   wherein said data storage drive comprises a tape drive unit having a first printed circuit board connected on a first side thereof and a second printed circuit board connected on a second side thereof and said first leaf spring and said first protrusion abut said first and second printed circuit boards respectively.

9. The combination according to claim 8 further comprising secondary protrusions on at least one of said first wall and said second wall in a central region thereof for spacing said at least one of said first wall and said second wall from one of said first and second printed circuit boards respectively.

10. The suspension according to claim 1 wherein said frame comprises opposite side walls connected respectively to said first wall and said second wall, said frame closely surrounding the data storage drive when installed into said space and comprising an aperture on at least one of said side walls, arranged for receiving a resilient tab of the data storage drive to lock the data storage drive into said frame.

11. The suspension according to claim 1 wherein said frame comprises threaded holes for securing said frame to a computer housing.

12. The suspension according to claim 1 wherein said frame is composed of an electromagnetic shielding material.

13. A suspension for mounting a data storage drive into a computer housing, comprising:
   a suspension frame having a top wall and a bottom wall and opposite side walls connected respectively to said top wall and said bottom wall defining a space therebetween, said frame having an open end for receiving a data storage drive slidingly therein, said frame closely surrounding the data storage drive when installed into said space;
   first, second and third leaf springs and first, second and third protrusions, said first, second and third leaf springs and said first, second and third protrusions mounted to one of said top and bottom walls respectively and acting to clamp said data storage drive in respective leaf spring/protrusion pairs, each leaf spring facing opposite a respective protrusion across said space to provide a planar suspension of said data storage drive in said frame.

14. A suspension and a data storage drive combination for mounting into a computer housing, comprising:
   a data storage drive;
   a suspension frame having a top wall and a bottom wall and opposite side walls connected respectively to said top wall and said bottom wall defining a space therebetween, said frame having an open end for receiving a data storage drive slidingly therein, said frame closely surrounding the data storage drive when installed into said space;

first, second and third leaf springs and first, second and third protrusions, said first, second and third leaf springs and said first, second and third protrusions mounted to one of said top and bottom walls respectively and acting to clamp said data storage drive in respective leaf spring/protrusion pairs, each leaf spring facing opposite a respective protrusion across said space to provide a planar suspension of said data storage drive in said frame; and wherein said data storage drive comprises a tape drive unit having a first printed circuit board connected on a top thereof and a second printed circuit board connected on a bottom thereof and said resilient members and said protrusions each abut one of said first and second printed circuit boards.

15. The combination according to claim 14 further comprising secondary protrusions on at least one of said top wall and said bottom wall in a central region thereof for spacing said at least one of said top wall and said bottom wall from an adjacent one of said first and second printed circuit boards respectively.

16. The suspension according to claim 13 further comprising a further resilient member mounted on one of said side walls and two spaced apart inwardly directed further protrusions mounted on an opposite one of said side walls.

17. The suspension according to claim 13 wherein said frame is composed of an electromagnetic shielding material.

18. A suspension for mounting a data storage drive into a computer housing, comprising:

a rectangular container having first, second, third and fourth walls for receiving the data storage drive therein having means for mounting said container to a computer housing;

a means for resiliently supporting said data storage drive within said container;

said container having an open end for receiving the data storage drive slidingly therein; and said means for resiliently supporting including a stationary detent on said first wall and a leaf spring on said second wall aligned with the stationary detent and arranged and shaped for progressive engagement by flexing as the data storage drive is slid into said container.

19. The suspension according to claim 18 further comprising a means for locking said data storage drive into said container when fully inserted.

20. The suspension according to claim 19 wherein said means for locking comprises an aperture through a side wall of said container, arranged for receiving a resilient tab connected to the data storage drive.

21. The suspension according to claim 18, further comprising second and third stationary detents on said first wall and second and third leaf springs on said second wall, said second stationary detent aligned with said second leaf spring, said third stationary detent aligned with said third leaf spring; and a fourth leaf spring arranged on said third wall and at least one stationary detent arranged on said fourth wall, said leaf springs arranged to press said data storage drive against stationary detents.

22. The suspension according to claim 21, wherein said leaf springs are cut out cantilever portions of said second and third walls, bent into an inside of said container; and said stationary detents are inwardly extending semi-spherical protrusions formed as depressions in said first and fourth walls.

23. The combination according to claim 14 further comprising a further resilient member mounted on one of said side walls and two spaced apart inwardly directed further protrusions mounted on an opposite one of said side walls.

24. The combination according to claim 14 wherein said frame is composed of an electromagnetic shielding material.

25. The combination according to claim 8 wherein said suspension frame comprises opposite side walls connecting said first and second walls and forming therewith a rectangular container with a first open end, one of said side walls comprising a further leaf spring and the respective other side wall comprising at least one protrusion for acting with said further leaf spring to clamp said data storage drive in a lateral direction when said data storage drive is slid into said suspension frame through said first open end.

26. The combination according to claim 14 further comprising a fourth leaf spring formed on one of said side walls and at least one protrusion formed on a respectively opposite side wall for resiliently clamping said data storage drive in a lateral direction.

* * * * *